United States Patent [19]  
Harris

[11] 3,918,763  
[45] Nov. 11, 1975

[54] WHEEL TRIM
[75] Inventor: Frank L. Harris, Ann Arbor, Mich.
[73] Assignee: Norris Industries, Inc., Ypsilanti, Mich.
[22] Filed: Apr. 29, 1974
[21] Appl. No.: 465,290

[52] U.S. Cl............................. 301/37 B; 301/37 B
[51] Int. Cl.² ......................................... B60B 7/06
[58] Field of Search............ 301/37 R, 37 ST, 37 T, 301/37 C, 37 CD

[56] References Cited
UNITED STATES PATENTS
3,322,468   5/1967   Spisak............................. 301/37 R
3,746,397   7/1973   Buerger........................... 301/37 R Primary Examiner—Lloyd L. King
Assistant Examiner—D. W. Keen
Attorney, Agent, or Firm—Harness, Dickey & Pierce

[57] ABSTRACT
Wheel trim for the axially outer face of a vehicle wheel includes a decorative cover member, an annular retention band member, and a plurality of circumferentially spaced spring retention clips secured in novel assemblage with the retention band member and the cover member. Each clip has a pair of projecting tabs directed away from the clip body in opposite circumferential directions, and each projecting tab is disposed over a notch created in the outer periphery of the retention band member by the formation of an integral securing tab which extends from the edge of its notch to overlie the corresponding projecting tab. The outer periphery of the cover wraps around and over the outer periphery of the retention band member to secure the two in assembled relation and, in doing so, also wraps around and over the radially outer edges of the projecting tabs thereby to cooperate with the securing tabs in securing the clips in assembly with the two members. The retention band member is a split-ring extending substantially entirely around the periphery of the cover but terminating in juxtaposed ends separated by a small gap. In the preferred embodiment, the clips are circumferentially oriented so that one of them bridges this gap, and the assembly of this clip to the wheel trim prevents the juxtaposed ends of the retention band member from being displaced toward each other and thus prevents circumferential contraction of the band. The wrapping of the cover around the retention band prevents circumferential expansion of the latter. A novel method for making wheel trim is also disclosed.

15 Claims, 6 Drawing Figures

U.S. Patent  Nov. 11, 1975  3,918,763
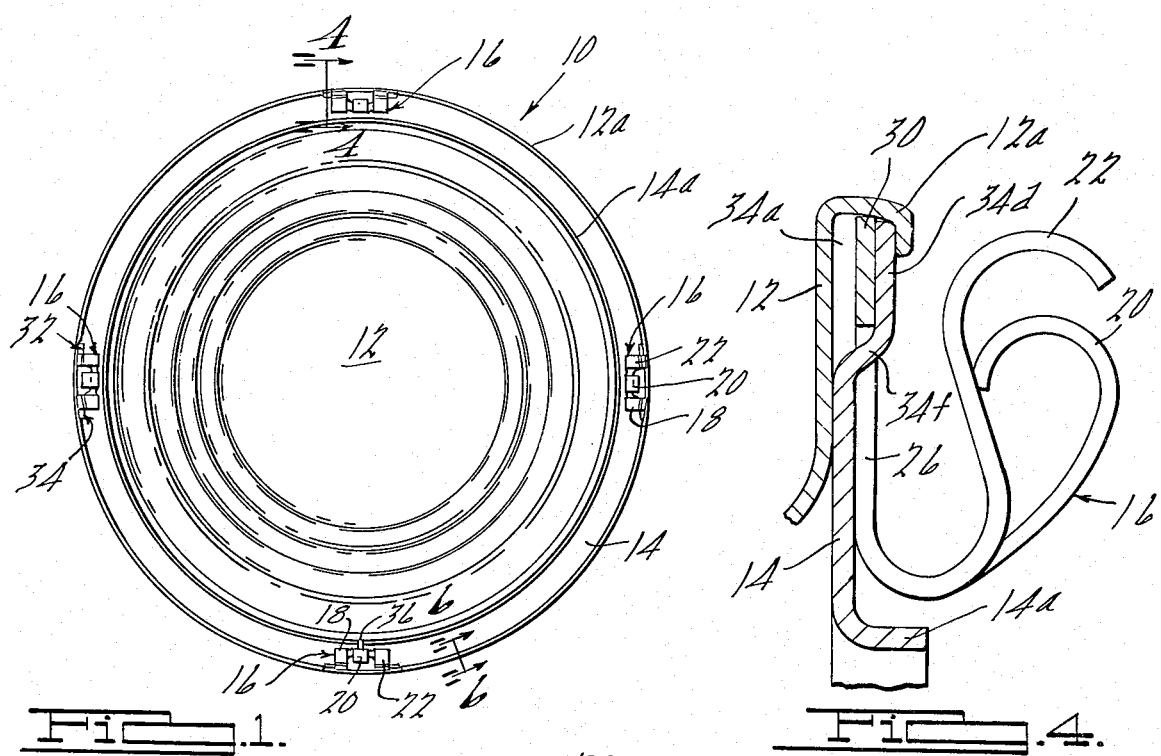
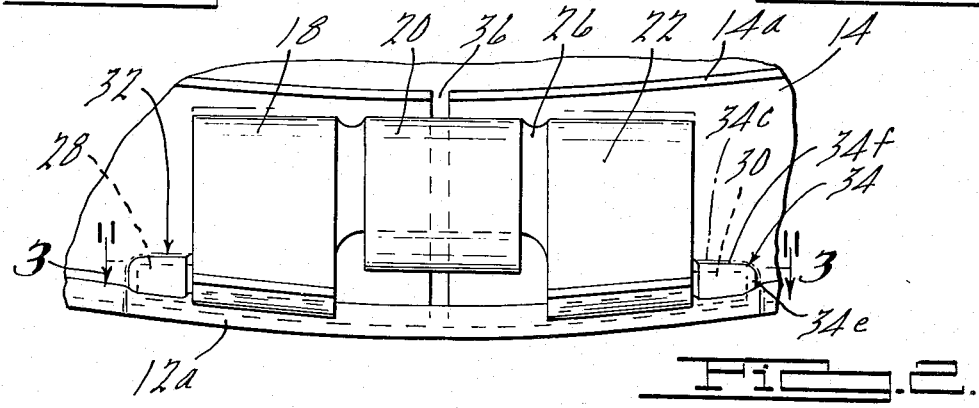
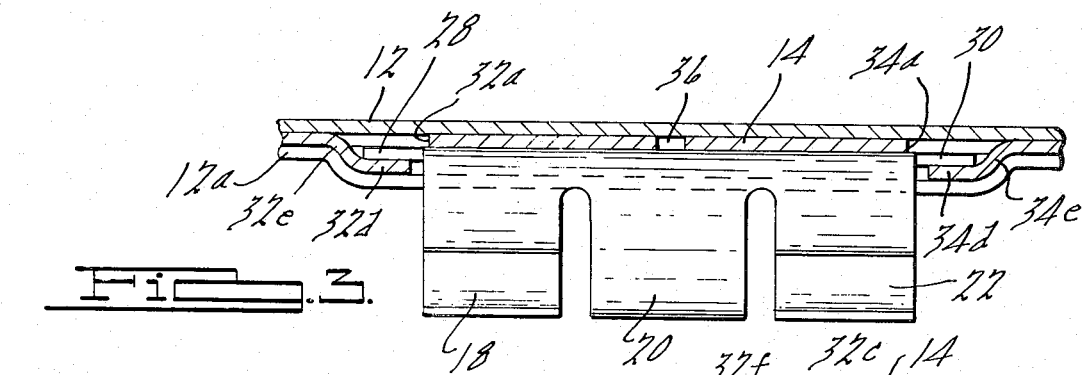
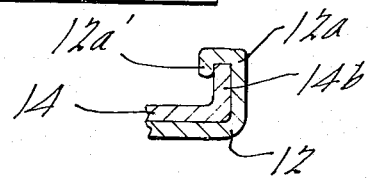
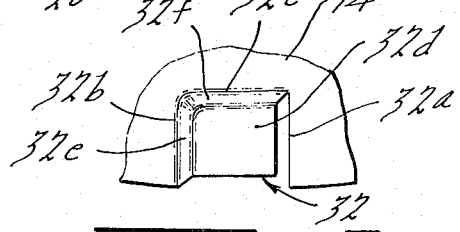

WHEEL TRIM

BACKGROUND AND SUMMARY OF THE INVENTION

The present invention pertains to vehicle wheel trim for disposition on the axially outer face of a vehicle wheel and, in particular, to a wheel trim assembly of the type including decorative cover member, an annular retention band member, and individual spring retention clips.

Wheel trim presently in use is often of multipiece construction. One such construction includes annular retention band structure to which a decorative cover member is affixed usually by wrapping the outer periphery of the cover member around the outer periphery of the retention band structure. A plurality of spring retention clips are secured at intervals to the retention band structure (as by welding or the like), and the clips grip the vehicle wheel to removably retain the wheel trim thereon.

In a preliminary novelty search conducted in connection with the present invention, the following U.S. Pat. Nos. were found: 2,431,338; 2,544,705; 2,848,277; 2,898,153; 2,899,240; 2,996,336; 3,252,739; 3,322,468; and 3,746,397. Although the principles of the present invention are potentially applicable to many spring retention clip designs, the present invention is especially well suited for spring retention clips of the type disclosed in U.S. Pat. No. 3,322,468 assigned to the assignee as the present application; and, in certain aspects, the present invention represents an improvement on the wheel trim disclosed in this patent, especially with respect to the assembly of spring clips to the wheel trim. It also constitutes a different solution to the clip-retention problem than is disclosed in application Ser. No. 457,814 for WHEEL TRIM filed Apr. 4, 1974 now U.S. Pat. No. 3,868,147 and also assigned to the assignee of this application.

The present invention, in another aspect, is directed toward improvements in the annular retention band member, which is usually formed from a strip of metal. In most wheel trim designs, it is important that the retention band member be constrained against both circumferential expansion and contraction; yet, at the same time, it is desirable to manufacture the retention band member from strip stock (rather than an annular stamping) for reasons of economy. Heretofore, several techniques have been used for this purpose. In one, the strip from which the retention band member is formed is cut to a length sufficiently long to allow the ends to be welded together (usually with the ends overlapped) and thereby form a continuous retention band member of fixed circumference. This technique is wasteful because, at a minimum, an extra welding operation is necessary, and the extra length of the strip required increases material costs. In another technique, the retention band is formed to be a split-ring in which the ends merely abut one another and are not joined together. However, this technique is not without problems. If the lengths of the cut strips are not held to a close tolerance, some of the strips will be too long and some too short. When a strip is too long the band will have too large a diameter to be properly assembled to the wheel trim; and when a strip is too short the band will be susceptible to circumferential contraction when put to use and this may create defective retention of the wheel trim on a wheel. On the other hand, if the strips are precisely cut to length, manufacturing cost is materially increased.

The present invention is thus directed also toward a novel wheel trim construction in which the wheel trim retention band is constrained against both circumferential expansion and contraction and yet requires neither precision cutting of the strip from which it is formed nor a separate joining operation to join the ends of the strip together.

Among the objects of the present invention are to provide an improved wheel trim which: has only a single retention band member; securely assemblies spring retention clips, retention band member, and cover member together without welding, soldering, or like processes; requires no separate fasteners for the assembly; and permits the retention band member to be formed from a strip of metal without joining the ends of the retention band together and without precision cutting of the length of the strip. A related object concerns the provision of an improved method of manufacture which is economical and efficient.

Other objects, features, and advantages of the invention will be seen from the ensuing description and claims which are to be taken in conjunction with the accompanying drawing.

BRIEF DESCRIPTION OF THE DRAWING

The drawing illustrates a preferred embodiment of wheel trim in accordance with the best mode presently contemplated for carrying out the invention.

FIG. 1 is a plan view of the axially inner face of vehicle wheel trim embodying principles of the present invention;

FIG. 2 is an enlarged fragmentary view of a portion of FIG. 1;

FIG. 3 is a sectional view taken in the direction of arrows 3—3 in FIG. 2;

FIG. 4 is an enlarged fragmentary sectional view taken in the direction of arrows 4—4 in FIG. 1;

FIG. 5 is a view taken in the same direction as FIG. 2 but illustrating an enlarged fragmentary portion of one of the elements thereof shown by itself; and FIG. 6 is an enlarged sectional view taken in the direction of arrows 6—6 in FIG. 1 and illustrating a modified form.

DESCRIPTION OF THE PREFERRED EMBODIMENT

In the drawing, vehicle wheel trim 10 in accordance with principles of the present invention comprises a decorative cover member 12; a single annular retention band member 14 in the form of a split-ring formed from a flat strip of metal using known techniques and having a stiffening flange 14a; and a plurality of individual spring retention clip members 16. Cover member 12 is illustratively disclosed as a full cover which is adapted to cover substantially the entire outer face of a vehicle wheel when wheel trim 10 is mounted thereon, although it will be appreciated that other types of cover member may be alternatively used in the practice of the present invention.

While its principles are potentially applicable to various spring retention clip designs, the present invention is especially well suited for spring retention clips of the general type shown in U.S. Pat. No. 3,322,468 as mentioned above, and the illustrated preferred embodiment contemplates the use of four such clips 16 disposed at 90° intervals around wheel trim 10, with each clip 16 having three circumferentially spaced, formed retention fingers 18, 20, and 22 via which the wheel trim removably mounts on the outer terminal flange of a vehicle wheel rim (not shown). Each spring retention clip 16 comprises a flat body 26 disposed against the axially inner surface of retention band member 14 with the three retention fingers 18, 20, and 22 formed at the radially inner portion of body 26 to project axially inwardly of retention band member 14 for engagement with the terminal flange of the wheel rim. As shown in FIG. 2, a pair of circumferentially directed projecting tabs 28 and 30, respectively, project away from body 26 on circumferentially opposite sides thereof and lie in the same plane as body 26.

In accordance with principles of the present invention, each clip 16 is retained on retention band member 14 by means of a corresponding pair of lanced and embossed clip securing tabs 32 and 34 formed in retention band member 14 and by means of the outer periphery 12a of cover member 12, the latter being wrapped over and around the outer periphery of retention band member 14 and all securing tabs 32 and 34 and projecting tabs 28 and 30. In the illustrated construction, clips 16 are securely held against retention band member 14 and substantially immovably constrained against both radial and circumferential movement thereon.

Initially, retention band member 14 is imperforate at the location of each clip securing tab 32 and 34, each tab being formed from retention band member 14 by lancing and embossing. Attention is directed to FIG. 5 which is a fragmentary view of the retention band member shown by itself illustrating detail of one of the clip securing tabs 32. While detail of clip securing tabs 34 is not shown in the drawing on the same scale as for tab 32 in FIG. 5, it is to be understood that each clip securing tab 34 is the mirror image of the corresponding tab 32 relative to a radial plane bisecting the clip. Hereinafter, portions of tab 34 corresponding to like portions of tab 32 are literally suffixed relative to the base numeral 34 in the same manner as the portions of tab 32 are relative to the base numeral 32. In forming clip securing tab 32, the imperforate retention band member 14 is first lanced along a radial line 32a and then the tab is formed to its illustrated shape by embossing which displaces material from the plane of the retention band member so that, in the assembled wheel trim, the tab is disposed axially inwardly of the residual notch created in the retention band member. The residual notch is of generally rectangular shape and extends radially inwardly from the radially outer edge of the retention band member. The notch is defined by a pair of circumferentially spaced, generally radial edges 32a and 32b whose radially inner ends are connected by a circumferentially extending edge 32c (the edge 32a being the line of lancing 32a). The tab 32 comprises an overlying generally rectangular portion 32d disposed in a plane parallel to the plane of retention band member 14 and integrally connected by means of formed connecting sections 32e and 32f, respectively, to edges 32b and 32c, respectively. The shape of the tab defines between its overlying portion 32d and the residual notch, an opening which is coextensive with the free edges of the overlying portion 32d and which has an axial dimension just slightly greater than the thickness of the corresponding clip projecting tab 28. This opening and the corresponding opening defined between the corresponding tab 34 and its residual notch permit the projecting tabs 28 and 30 of the corresponding clip 16 to be lodged beneath the clip securing tabs 32 and 34.

In assembling members 12 and 14 and clips 16, the clips are first preliminarily assembled to retention band member 14. This is accomplished by first positioning the clip body 26 radially outwardly of its assembled position with the projecting tabs 28 and 30 thereof circumferentially aligned with tabs 32 and 34 and then moving the clip radially inwardly to lodge the projecting tabs 28 and 30 thereof between the overlying securing tab portions 32d and 34d and the residual notches in the retention band member. The circumferential dimension between the connecting sections 32e and 34e just exceeds the circumferential dimension of the clip as measured across the clip between the free ends of projecting tabs 28 and 30 to thereby permit lodging of the projecting tabs to positions where the radially inner edges thereof abut the radially inner connecting sections 32f and 34f.

Assembly is completed by applying the cover member and wrapping the outer periphery thereof around and over the outer periphery of the retention band member and, in doing so, also wrapping (as by spinning or the like) the cover periphery at least over all tabs 28 and 30, but preferably over all tabs 32 and 34 as well. Connecting sections 32e and 34e circumferentially constrain the corresponding clip. Hence, the clips are secured and substantially immovably constrained against both radial and circumferential displacement relative to retention band member 14.

In the disclosed embodiments, it will be observed that the split-ring construction of retention band member 14 may have a small gap 36 between the juxtaposed ends thereof. It will be further observed that one of the clips 16 is circumferentially located to bridge this gap. This construction provides a significant advantage in the assembly of the wheel trim because it obviates the need to either weld the ends of the band together or to precisely cut the strip from which the band is formed to extremely close tolerances. With the present invention, the clip securing tabs 32 and 34 are formed by a lancing and embossing die in which the retention band member is circumferentially confined. Since the die must be constructed to accurately locate the tabs 32 and 34 in each set relative to each other, the dimension of the gap is rendered non-critical by locating one of the clips to bridge this gap. Hence, the length of the cut strip from which the retention band is formed is not critical (so long as it is not too long) and, therefore, the costs associated with precision cutting and/or welding are dispensed with. Preferably, the strip is cut undersize with a loose tolerance, so that the nominal length plus the maximum positive tolerance does not exceed the maximum circumference of the retention band. In the assembled wheel trim, the clip bridging the gap between the ends of the band serves to constrain the band against circumferential contraction while the wrapping of the outer periphery of the cover around and over the outer periphery of the retention band serves to constrain the band against circumferential expansion.

While the aforementioned construction is advantageous for the reasons discussed, it should be appreciated that circumferential contraction of the retention band may also be prevented using an alternative technique. One such alternative is to provide a retention band and cover construction such as shown in FIG. 6 in which the outer periphery of the retention band is provided with an axially inwardly directed flange 14b around which the outer periphery of the cover is wrapped, as illustrated. In particular, by providing the axially outwardly extending wrap 12a around at the edge of flange 14b, the band is constrained against circumferential contraction, and yet loose tolerances may still be used with respect to the retention band length. It will also be appreciated that the invention, insofar as the retention of the clips is concerned, may be practiced irrespective of whether the retention band is a split-ring or a continuous element.

While it will be apparent that the preferred embodiments of the invention disclosed are well calculated to fulfill the objects above stated, it will be appreciated that the invention is susceptible to modification, variation, and change without departing from the spirit thereof.

What is claimed is:

1. A wheel trim assembly for disposition on the axially outer face of a vehicle wheel, comprising in combination: a cover member for covering at least a portion of the axially outer face of a vehicle wheel; a one-piece annular retention band member disposed on the axially inner face of said cover member; a plurality of spaced individual spring retention clips disposed about the axially inner face of said retention band member for removably mounting the wheel trim assembly on a vehicle wheel; integral positioning means bent out of said band member for restraining said clips against movement with respect to said band member in a circumferential direction and in a radially inwardly direction; and flange means on said cover member for rigidly securing said spring retention clips to said retention band member and said retention band member to said cover member.

2. A wheel trim assembly as claimed in claim 1, wherein said flange means extends about the outer periphery of said cover member.

3. A wheel trim assembly as claimed in claim 1, wherein said tab is disposed at the outer periphery of said retention band.

4. A wheel trim assembly as claimed in claim 1, wherein said retention band member has an axially inwardly extending flange portion grippingly engaged by said flange means on said cover member.

5. A wheel trim assembly for disposition on the axially outer face of a vehicle wheel, comprising in combination: a cover member for covering at least a portion of the axially outer face of a vehicle wheel; an annular retention band member lying in a plane substantially perpendicular to the axis of the wheel trim assembly and disposed on the axially inner face of said cover members; a plurality of spaced individual spring retention clips disposed about the axially inner face of said retention band member for removably mounting the wheel trim assembly on a vehicle wheel, each clip comprising at least one projecting tab, said retention band member comprising a clip securing tab having an overlying portion overlying an opening in said retention band member and an integral connecting section connecting said overlying portion with the edge of said opening, said projecting tab being disposed between said overlying portion and said opening; and flange means integral with said cover member for rigidly securing said spring retention clips and said retention band member to said cover member, said flange means engaging said tab to secure said clip to said band member and cover member.

6. A wheel trim assembly as claimed in claim 5, wherein said integral connecting section constrains said projecting tab against radially inward displacement.

7. A wheel trim assembly as claimed in claim 6, wherein said integral connecting section also constrains said projecting tab against circumferential displacement in one direction.

8. In a method of making wheel trim of the type comprising a cover member, an annular retention band member, and a plurality of spring retention clips, each of which clips includes a body having a pair of spaced projecting tabs projecting from the body, the steps comprising: forming in said retention band member adjacent the outer periphery thereof a pair of securing tabs for radially inwardly and circumferentially locating each clip; thereafter moving said spring clips radially inwardly to lodge the projecting tabs thereof under said securing tabs; assembling the cover member onto the retention band member; and wrapping the outer periphery of the cover member over the outer periphery of the retention band member and the projecting tabs of the clips.

9. A method as claimed in claim 8, wherein said tabs comprise projections bent from the plane of said retention band member.

10. A wheel trim assembly for disposition on the axially outer face of a vehicle wheel, comprising in combination: a cover member; an annular retention band member having a given shape and terminating in juxtaposed circumferentially spaced ends defining a gap therebetween; an element bridging said gap and interengaged between the juxtaposed ends of the retention band member to prevent movement of said ends toward each other and hence prevent contraction of said retention band member from said given shape; and means on said cover member engaging said retention band member to prevent expansion of the latter from said given shape.

11. A wheel trim assembly as claimed in claim 10, further comprising means on said element for releasably retaining said wheel trim assembly on a vehicle wheel.

12. A wheel trim assembly as claimed in claim 10, wherein said last-mentioned means comprises flange means on the outer periphery of said cover member extending around and over the outer periphery of said retention band member.

13. A wheel trim assembly as claimed in claim 12, wherein said flange means fixedly secures said element and said retention band member to said cover member.

14. A wheel trim assembly as claimed in claim 10, wherein said retention band member includes a pair of embossments at opposite ends thereof facing each other across said gap, said element being lodged between said embossments.

15. A wheel trim assembly for disposition on the axially outer face of a vehicle wheel, comprising in combination: a cover member for covering at least a portion of the axially outer face of a vehicle wheel; an annular retention band member lying in a plane substantially perpendicular to the axis of the wheel trim assembly and disposed on the axially inner face of said cover member; a plurality of spaced individual spring retention clips disposed about the axially inner face of said retention band member for removably mounting the wheel trim assembly on a vehicle wheel, said retention band member comprising a split-ring terminating in juxtaposed ends defining a gap therebetween, one of said clips bridging said gap; and flange means integral with said cover member for rigidly securing said spring retention clips and said retention band member to said cover member.

* * * * *